United States Patent [19]

Furuta et al.

[11] 4,406,399
[45] Sep. 27, 1983

[54] METHOD OF CONTROLLING AN ENAMELLING OVEN

[75] Inventors: Katsuhisa Furuta, Tokyo; Takeshi Hirai, Kanagawa; Yoshinori Nakamura, Kawasaki, all of Japan

[73] Assignee: Showa Electric Wire & Cable Co., Ltd., Kawasaki, Japan

[21] Appl. No.: 400,476

[22] Filed: Jul. 21, 1981

[30] Foreign Application Priority Data

Jul. 28, 1981 [JP] Japan ................................ 56-117987

[51] Int. Cl.³ .......................... F23N 1/00; F27D 19/00
[52] U.S. Cl. .............................. 236/15 BC; 236/78 A; 364/172; 432/49
[58] Field of Search ......... 236/15 BC, 15 BR, 15 BB, 236/78 A, 78 B; 432/49; 307/39; 364/149, 172

[56] References Cited

U.S. PATENT DOCUMENTS 3,473,008 10/1969 Bay et al. ...................... 235/151.12
3,714,952 2/1973 Bristol .................................. 137/1

FOREIGN PATENT DOCUMENTS 2224808 of 0000 France.
2215652 of 0000 France.
2426934 of 0000 France.

OTHER PUBLICATIONS

Englander, Arnold, "The Benefits and Problems of P.I.D. Feedback Control", Wire Journal, Sep. 1981, pp. 234–239.
Degen, R. J., "Entwurf und Simulation eines adaptiven Regelungssystems mit Modellabgleich"; Regelungstechnik, vol. 24, No. 1, 1976 pp. 24–27.
MacFarlane, A. G. J.: Stevenage, "Multivariable-control-system design techniques: A guided tour", Proceeding IEE, vol. 117, No. 5, May 1970, pp. 1039–1047.
Young, S. C. K., "Raw Material Blending - A Multivariable Control Problem"; IEE Conference Publication, No. 78, Sep. 1971.

Primary Examiner—William E. Wayner
Attorney, Agent, or Firm—Kenway & Jenney

[57] ABSTRACT

Disclosed is a method of controlling an enamelling oven, in which a plurality of controlled variables such as temperatures:

$$Y=(Y1 \ldots Yl)$$

including a plurality of measured variables:

$$(Y1 \ldots Ym)$$

are variable by any one of a plurality of manipulation variables such as the degrees of opening of dampers:

$$U=(U1 \ldots Um)$$

where l and m are positive integers equal to or greater than 2 with m>l. The method comprises the step of controlling the controlled variables to reach reference values therefor:

$$YR=(YR1 \ldots YRl)$$

by effecting integrating action on each of variable factors:

$$U'c=(Uc1 \ldots UcM)$$

which are derived from the differences between the controlled variables and the reference values:

$$Y-YR=(Y1-YR1 \ldots Y-YRl)=(\epsilon1 \ldots \epsilon l)$$

to produce outputs $$Uc=(Uc \ldots UcM)$$

which serve as the controlled variables, respectively.

15 Claims, 4 Drawing Figures

METHOD OF CONTROLLING AN ENAMELLING OVEN

BACKGROUND OF THE INVENTION

The present invention relates to a method of controlling an enamelling oven, and more particularly a method of controlling an enamelling oven in which a controlled variable such as an oven temperature is a multivariable.

Figure 1:
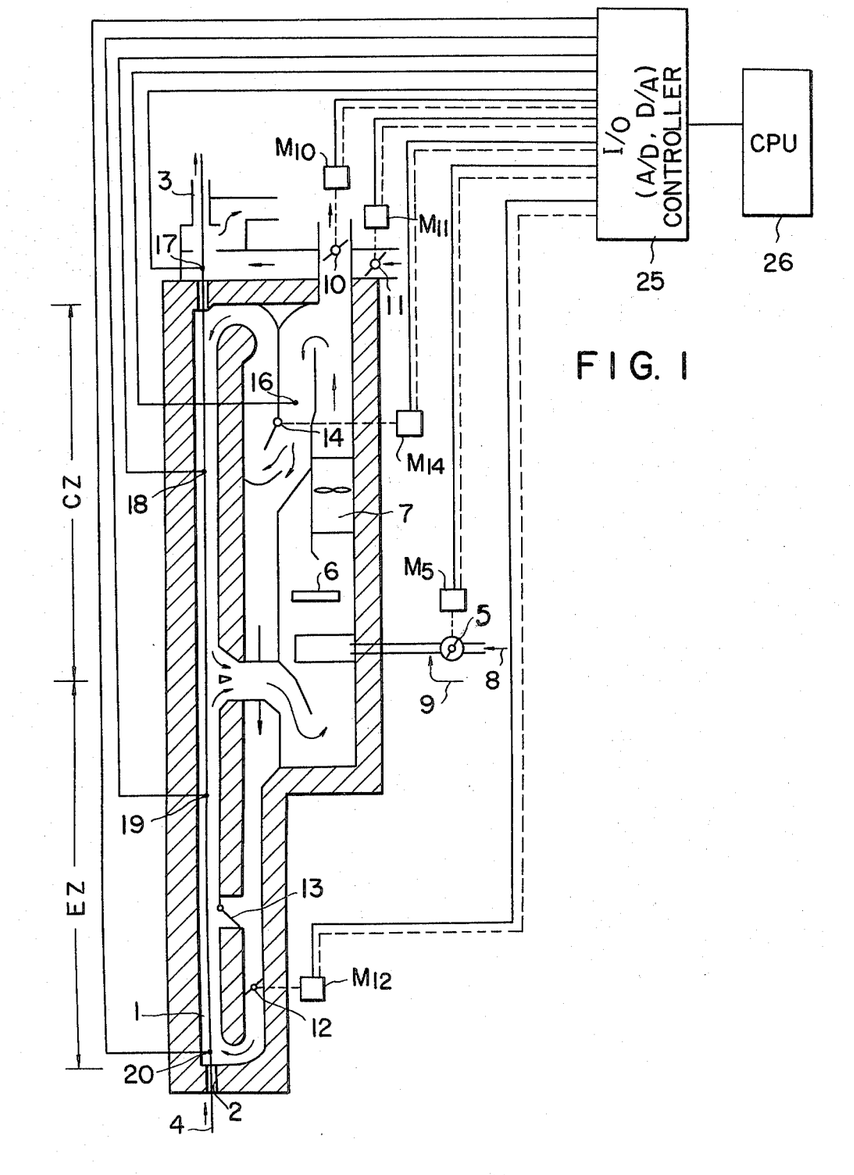
FIG. 1 is a cross-sectional view of a thermal gas circulating enamelling oven to be controlled.

There has heretofore been known a thermal gas circulating enamelling oven for fabricating insulated electric wires of copper or aluminum coated with baked insulating paint for use in electric motors and the like. As shown in FIG. 1 of the accompanying drawings, such a known enamelling oven includes a wire travelling path 1 through which a wire 4 runs from a wire inlet 2 toward a wire outlet 3. While the wire 4 is travelling through the path 1, a solvent of varnish to be baked such as ester or formalin resin which has been coated on the wire in advance is heated to a high temperature by a gas supplied through a damper 5 and combusted by a catalyst 6, the combusted high-temperature gas being circulated by a blower 7 in the directions of the arrows.

The damper 5 serves to adjust the amount of air 8 supplied and hence the amount of gas 9 such as butane supplied dependent on the amount of air 8 as controlled by the damper 5. The enamelling oven also includes other dampers. More specifically, a damper 10 is mounted on an upper portion of the oven for regulating the amount of air discharged from the oven. A damper 11 defines a pressure chamber for sealing hot air from the oven. Dampers 12, 13 cooperate with each other in feeding hot air directly into an upper portion of a vaporizing zone EZ. A damper 14 serves to divide hot air into flows directed to a curing zone CZ and the vaporizing zone EZ. Through the control of the damper 14, the amounts of hot air supplied into the curing and vaporizing zones are varied to adjust the curing of the material baked on the wire.

The degrees of opening of the dampers 5, 10, 11, 12, 14 can be adjusted to provide optimum thermal distribution in the vaporizing zone EZ and the curing zone CZ for thereby determining the curing of the varnish coated on the wire.

The thermal distribution in the vaporizing and curing zones are measured by various temperature detecting points in the oven. Such temperature detecting points include a point 16 for detecting the temperature of hot air prior to division thereof into the curing and vaporizing zones, a point 17 located where the hot air from the oven and cool air from the damper 11 are joined, a point 18 located centrally in the curing zone, a point 19 located in an upper portion of the vaporizing zone, and a point 20 located in a lower portion of the vaporizing zone.

A single enamelling oven normally enamels a variety of electric wires having a diameter ranging from 0.6 to 2 mm and travelling at various speeds dependent on the diameter of the wires. A pair of such enamelling ovens are operated at the same time each for baking ten sets of seventy electric wires. During enamelling operation, the enamelling ovens are thermally affected from each other, and the amounts of gas normally supplied to the ovens should be varied dependent on the wire diameter and the kind of varnish used.

For controlling the oven temperature under such circumstances, it has been proposed and practiced to utilize PI controllers respectively for controlling the temperature at the point 16 with the damper 5, the temperature at the point 17 with the damper 11, and the temperature at the point 20 with the damper 10. With such a prior practice, the temperatures at the points 16, 17 can be controlled at desired levels, but the temperatures at the points 18, 19, 20 which are important controlled variables in the embodiment of the present invention cannot be regulated for desired temperature distributions or gradients. The difficulty arises out of the fact that when one of the dampers is adjusted to control the temperature at a corresponding one of the measuring points to reach a desired temperature, the temperatures at the other measuring points are also caused to change.

Stated otherwise, a multiplicity of measured variables (the temperatures at the points 16, 17, 18, 19, 20) including a multiplicity of controlled variables (the temperatures at the points 17, 18, 19, 20) are variable when any one of multiple manipulation variables (the degrees of opening of the dampers 5, 10, 11, 12, 14) is adjusted. It has heretofore been impossible in such multiple-variable control to simultaneously and automatically control the manipulation variables to bring the controlled variables to desired levels.

With the multiple controlled and manipulation variables being thus correlated, the foregoing process of controlling pairs of controlled and manipulation variables has rendered the controlled variables less stable and responsive.

SUMMARY OF THE INVENTION

The above-described drawbacks in the prior art process have been successfully eliminated by the present invention.

Accordingly, it is a principal object of the present invention to provide a method of controlling an enamelling oven having multiple controlled variables such as oven temperatures by simultaneously and automatically controlling manipulation variables such as the degrees of opening of dampers through detecting measured variables including the controlled variables so that the controlled variables will have desired reference values or target settings.

Another object of the present invention is to provide controlling means with increased stability and/or response in such a method of controlling an enamelling oven.

According to the present invention, the above objects can be achieved by a method of controlling an enamelling oven, in which a plurality of measured variables such as temperatures:

$$Y = \begin{pmatrix} Y_1 \\ \vdots \\ Y_m \end{pmatrix}$$

including a plurality of controlled variables:

$$\begin{pmatrix} Y1 \\ \vdots \\ Yl \end{pmatrix}$$

are variable by any one of a plurality of manipulation variables such as the degrees of opening of dampers:

$$U = \begin{pmatrix} U1 \\ \vdots \\ Un \end{pmatrix}$$

where l, n and m are positive integers equal to or greater than 2 with $m \geq 1$, the method comprising the step of controlling the controlled variables to reach reference values therefor:

$$YR = \begin{pmatrix} YR1 \\ \vdots \\ YRl \end{pmatrix}$$

by effecting integrating action on each of variable factors:

$$U'c = \begin{pmatrix} Uc1 \\ \vdots \\ Ucn \end{pmatrix}$$

which are derived from the differences between the controlled variables and the reference values:

$$Y - YR = \begin{pmatrix} Y1 - YR1 \\ \vdots \\ Yl - YRl \end{pmatrix} = \begin{pmatrix} \epsilon 1 \\ \vdots \\ \epsilon l \end{pmatrix}$$

to produce outputs $$Uc = \begin{pmatrix} Uc \\ \vdots \\ Ucn \end{pmatrix}$$

which serve as the controlled variables, respectively.
Furthermore, outputs:

$$UF = \begin{pmatrix} UF1 \\ \vdots \\ UFn \end{pmatrix}$$

which are obtained by effecting feedback action on the plurality of measured variables:

$$\begin{pmatrix} Y1 \\ \vdots \\ Ym \end{pmatrix}$$

including the controlled variables, are added to the manipulation variables.
Furthermore, outputs:

$$UN = \begin{pmatrix} UN1 \\ \vdots \\ UNn \end{pmatrix}$$

which are obtained by effecting feedforward action on the reference values, are added to the controlled variables.

In addition, the integrating action is stopped when the sum of the outputs Uc − the outputs UF + the outputs UN which are supplied to the manipulation variables exceeds a predetermined range.

These and other objects of the invention will become apparent from the following description of embodiments thereof when taken together with the drawings.

DETAILED DESCRIPTION OF THE PREFERRED EMBODIMENT

A method of controlling the temperature of a thermal gas circulating enamelling oven according to an embodiment of the present invention will be described with reference to the drawings.

According to the embodiment of the present invention, the dampers 5, 10, 11, 12, 14 shown in FIG. 1 are controlled for their opening by stepping motors M5, M10, M11, M12, M14, respectively, and thermocouples are disposed at the temperature measuring points 16, 17, 18, 19, 20, respectively. The stepping motors are supplied with input signals (along the solid lines) and produce output signals (along the dotted lines). The thermocouples generate output signals. The output signals from the stepping motors and the thermocouples are converted by an I/O controller 25 (A/D and D/A converters) into digital signals which are then supplied to a central processing unit CPU 26 (which may be one of a HP1000-M series manufactured by Hewlett Packard) in which the digital signals are subjected to arithmetic operations. The signals from the CPU 26 are then converted by the I/O controller 25 into analog signals which are supplied to the stepping motors.

A control system for such controlling operation will now be described with reference to FIG. 2.

A plurality of measured variables (the temperatures at the points 16, 17, 18, 19, 20):

$$\begin{pmatrix} Y1 \\ Y2 \\ Y3 \\ Y4 \\ Y5 \end{pmatrix}$$

including a plurality of controlled variables such as temperatures (the temperatures at the points 17, 18, 19, 20):

$$Y = \begin{pmatrix} Y1 \\ Y2 \\ Y3 \\ Y4 \end{pmatrix}$$

in an enamelling oven 30 to be controlled, are variable by any one of a plurality of manipulation variables such as damper opening degrees (the degrees of opening of the dampers 5, 10, 11, 12, 14):

$$U = \begin{pmatrix} U1 \\ U2 \\ U3 \\ U4 \\ U5 \end{pmatrix}$$

Figure 2:
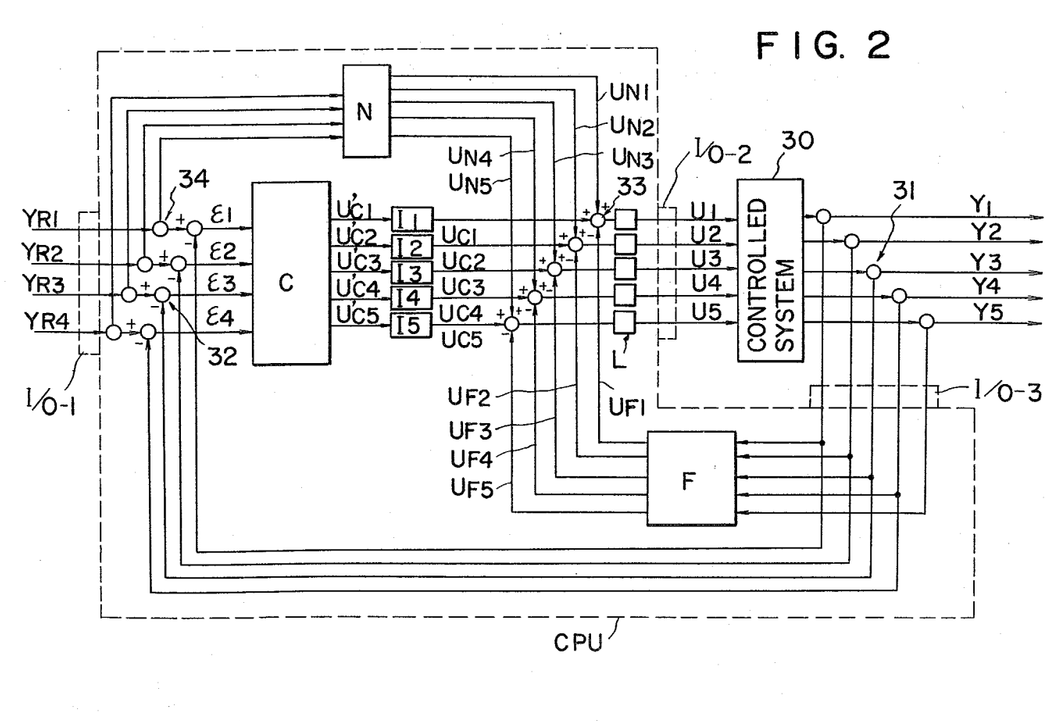
FIG. 2 is a block diagram of an automatic control system in which the present invention is applied to the enamelling oven.

In the control system of FIG. 2, the manipulation variables are controlled to adjust the controlled variables so as to reach set points or reference values:

$$YR = \begin{pmatrix} YR1 \\ YR2 \\ YR3 \\ YR4 \end{pmatrix}$$

The controlled variables Y1-Y4 are picked up at pick-off points 31 and delivered to subtracting points 32 in which the set points or reference values are subtracted from the controlled variables as follows:

$$\begin{pmatrix} Y1 - YR1 \\ \vdots \\ Y4 - YR4 \end{pmatrix} = \begin{pmatrix} \epsilon 1 \\ \vdots \\ \epsilon 4 \end{pmatrix}$$

The differences $\epsilon 1 \ldots \epsilon 4$ are applied to an arithmetic element C utilizing the matrix:

$$\begin{pmatrix} C11 \ldots C14 \\ \vdots \qquad \vdots \\ C51 \ldots C54 \end{pmatrix}$$

to produce variable factors $U'c1 \ldots U'c5$ through the following linear processing:

$$\begin{pmatrix} C11 \ldots C14 \\ \vdots \qquad \vdots \\ C51 \ldots C54 \end{pmatrix} \begin{pmatrix} \epsilon 1 \\ \vdots \\ \epsilon 4 \end{pmatrix} = \begin{pmatrix} U'c1 \\ \vdots \\ U'c5 \end{pmatrix}$$

These variable factors are supplied to ingegrators I1-I5 in which integrating action is effected on the manipulation variables to produce variables Uc1-Uc5 which are then added to the manipulation variables U1-U5.

The variables Uc can be expressed as a result of an integrating function carried out as follows:

$$Uc(t) = Uc(t - 1) + \begin{pmatrix} C11 \ldots C14 \\ \vdots \qquad \vdots \\ C51 \ldots C54 \end{pmatrix} \begin{pmatrix} \epsilon 1 \\ \vdots \\ \epsilon 4 \end{pmatrix}$$

The above integrating action includes not only linear integrating functions by the integrators, but integrating functions or similar actions. The integrating action may include dynamic compensation.

The elements in the arithmetic element C:

$$\begin{pmatrix} C11 \ldots C14 \\ \vdots \qquad \vdots \\ C51 \ldots C54 \end{pmatrix}$$

are determined in an optimum manner by an optimum control theory with the enamelling oven 30 as a model and by simulation of the behavior of the controlled variables $U'c1-U'c5$, the manipulation variables U1-U5 and the controlled variables Y1-Y4, at the time when the reference values YR1-YR4 are given prior to automatic control of the enamelling oven 30 as the control system. The teachings of which are hereby incorporated by reference to an article entitled "Control System Design for Furnace by Using CAD" by K. Furuta et al. at the IFAC symposium on the Theory and Application of Digital Control, Delhi, Session 20, 1982.

The pick-off points 31 are connected to subtracting points 33 through a feedback element F. The feedback element F effects feedback action through linear processing on the measured variables Y1-Y5 including the controlled variables Y1-Y4, and the measured variables thus processed are subtractively added to the manipulation variables U1-U5. This feedback may include dynamic compensation. The outputs UF from the feedback element F are as follows:

$$UF = \begin{pmatrix} UF1 \\ \vdots \\ UF51 \end{pmatrix} = \begin{pmatrix} F11 \ldots F15 \\ \vdots \qquad \vdots \\ F51 \ldots F55 \end{pmatrix} \begin{pmatrix} Y1 \\ \vdots \\ Y5 \end{pmatrix}$$

The elements:

$$\begin{pmatrix} F11 & \ldots & F15 \\ \vdots & & \vdots \\ F51 & \ldots & F55 \end{pmatrix}$$

can be predetermined by the foregoing optimum control theory and simulation.

Pick-off points 34 are connected through a feedforward element N to summing points 33. The feedforward element N effects feedforward action or proportionality action on the set points or reference values YR1–YR4 by way of linear processing, and the reference values YR1–YR4 thus processed are additively applied to the manipulation variables U1–U5. The feedforward action may include dynamic compensation. The outputs UN from the feedforward element N are as follows:

$$UN = \begin{pmatrix} UN1 \\ \vdots \\ UN51 \end{pmatrix} = \begin{pmatrix} N11 & \ldots & N14 \\ \vdots & & \vdots \\ N51 & \ldots & N54 \end{pmatrix} \begin{pmatrix} YR1 \\ \vdots \\ YR4 \end{pmatrix}$$

The elements:

$$\begin{pmatrix} N11 & \ldots & N14 \\ \vdots & & \vdots \\ N51 & \ldots & N54 \end{pmatrix}$$

can be predetermined as above by the foregoing optimum control theory and simulation.

Thus, three kinds of manipulation inputs are added to the manipulation variables U, which will eventually be as follows:

$$U = UC - UF + UN$$

Manipulation lines include limiters L (FIG. 2) for stopping the foregoing integrating actions when the sum of UC−UF+UN supplied as the controlled variables exceeds a predetermined range.

A portion enclosed by the dotted line in FIG. 2 represents the CPU which includes an input/output device I/O-1 as an input interface for A/D convertion of the reference values YR1–YR4, an input/outut device I/O-2 as an output interface for D/A conversion of the manipulation variables U1–U5, and an input/output device I/O-3 as an input interface for A/D conversion of the measured variables Y1–Y5 including the controlled variables Y1–Y4 as they are fed back.

Figure 3:
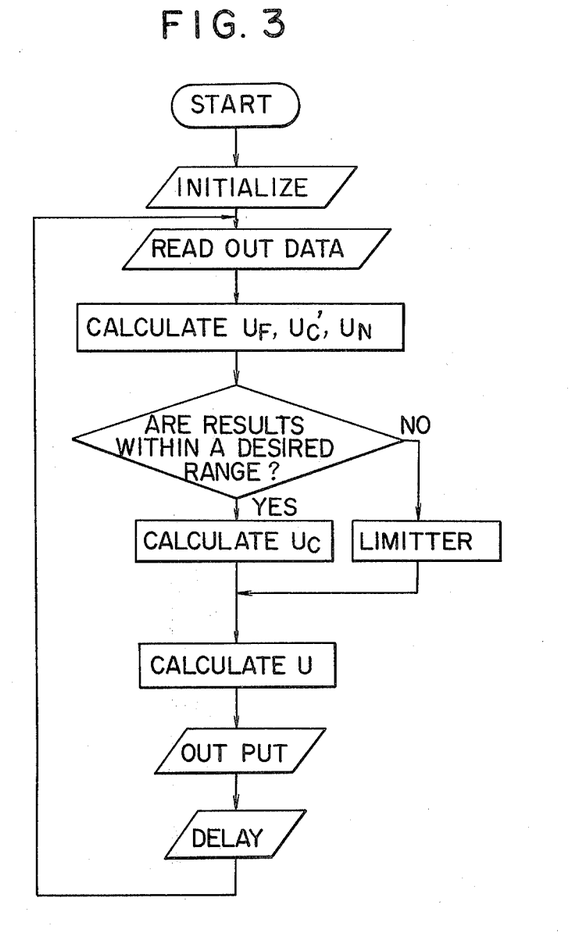
FIG. 3 is a flow chart of operations of the automatic control system shown in FIG. 2.

Operation of the multivariable automatic control system thus constructed is as follows:

The enamelling oven 30 is first operated to determine initial settings for integrating action dependent on the measured variables Y1–Y5 including the controlled variables Y1–Y4 as shown in FIG. 3. Then, the CPU reads data on the set points or reference values YR-1–YR4 and the measured variables Y1–Y5 including the controlled variables Y1–Y4. The arithmetic element C, the feedback elements F and the feedforward element N in the CPU effect arithmetic operations according to the foregoing matrices to calculate the following values:

$$U'c = \begin{pmatrix} U'c1 \\ \vdots \\ U'c5 \end{pmatrix} = \begin{pmatrix} C11 & \ldots & C14 \\ \vdots & & \vdots \\ C51 & \ldots & C54 \end{pmatrix} \begin{pmatrix} \epsilon 1 \\ \vdots \\ \epsilon 4 \end{pmatrix}$$

$$UF = \begin{pmatrix} UF1 \\ \vdots \\ UF5 \end{pmatrix} = \begin{pmatrix} F11 & \ldots & F15 \\ \vdots & & \vdots \\ F51 & \ldots & F55 \end{pmatrix} \begin{pmatrix} Y1 \\ \vdots \\ Y5 \end{pmatrix}$$

$$UN = \begin{pmatrix} UN1 \\ \vdots \\ UN5 \end{pmatrix} = \begin{pmatrix} N11 & \ldots & N14 \\ \vdots & & \vdots \\ N51 & \ldots & N54 \end{pmatrix} \begin{pmatrix} YR1 \\ \vdots \\ YR4 \end{pmatrix}$$

The manipulation variable outputs need to be controlled so as to be maintained within predetermined ranges. To this end, it is determined whether the manipulation variable outputs fall within such predetermined ranges. If within the ranges, the integrating action is performed on the manipulation variables, and if without the ranges, the manipulation variables are caused to pass through the limiters L (see FIG. 3).

Therefore, the integrators I1–I5 are operated to effect integrating action on the variable factors U'c1–U'c5 and produce the following integrating outputs:

$$Uc(t) = Uc(t-1) + \begin{pmatrix} U'c1 \\ \vdots \\ U'c5 \end{pmatrix}$$

The above functions thus incorporated can overcome the problem of producing unwanted manipulation variable signals for opening the dampers practically for the degree of 200% or 300% due to large differences $\epsilon 1 \ldots \epsilon 4$ between the manipulation variables and the reference values when ingegrating action would be effected from the start-up time on, notwithstanding the manipulation variables or degrees of opening of the dampers range from 0 to 100%.

The integrators repeat their integrating action until the difference between the reference values and the controlled variables:

$$\epsilon = \begin{pmatrix} YR1 \\ \vdots \\ Y4 \end{pmatrix} - \begin{pmatrix} Y1 \\ \vdots \\ YR4 \end{pmatrix}$$

becomes zero, so that a control loop is formed to bring the controlled variables toward the reference values as closely as possible.

The control variables U:

$$U = UC - UF + UN$$

are calculated and applied to the controlled system or enamelling oven 30.

The feedback outputs UF from the feedback element F function to stabilize the characteristics inherent in the control system.

The feedforward outputs UN from the feedforward element N are effective to enable the controlled variables Y to approach the reference values YR rapidly, especially at the start-up time of the enamelling oven. The feedforward element N thus serves to improve the response of the control system.

After the manipulation variables U have been delivered to the controlled system 30, operation of the control system is delayed for a predetermined time until the next temperature sampling is carried out. Then, the foregoing operation is repeated.

While in the illustrated embodiment the description has been directed to the control system having four controlled variables and reference values and five variable factors, manipulation variables and measured variables, the present invention is equally applicable to instances in which the number of controlled variables and reference values is l, the number of variable factors and manipulation variables is n and measured the number of variables is m (l, m and n are positive integers with m>l).

EXAMPLE

The following experiment was conducted using a thermal air circulating enamelling oven as shown in FIG. 1 having a height of 6 m and a width of 1.4 m.

Figure 4:
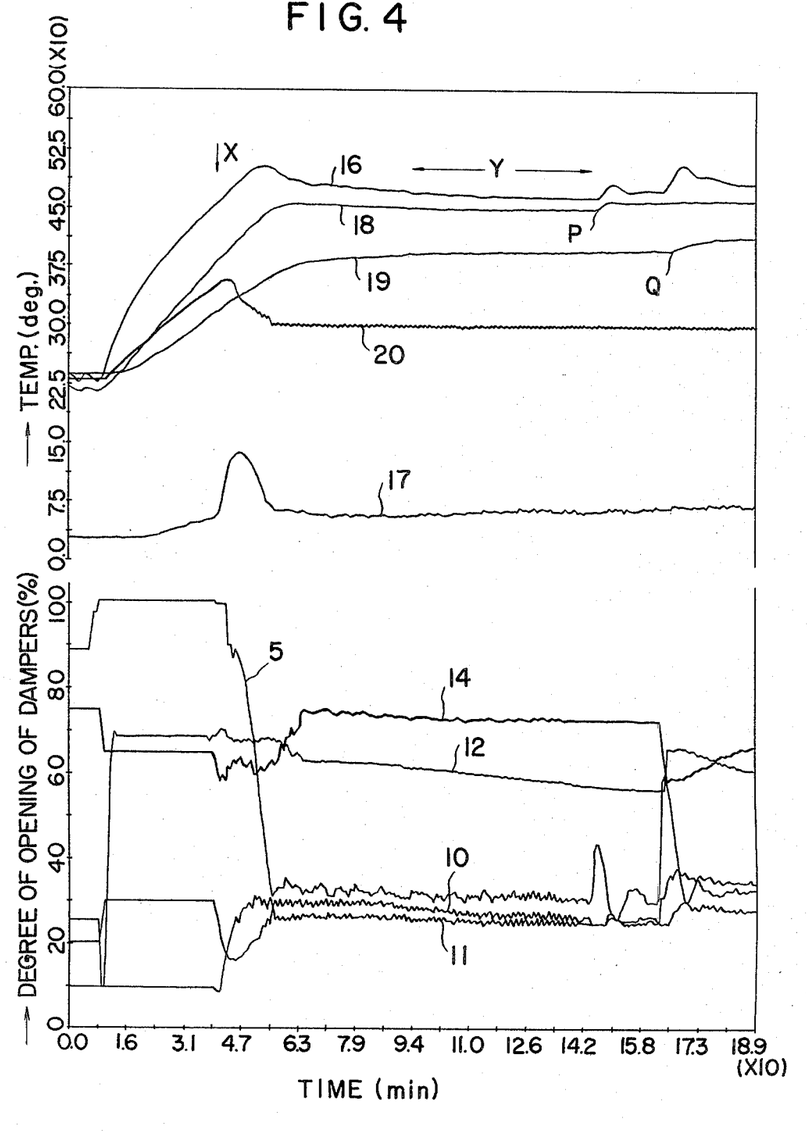
FIG. 4 is a graph showing results of control of controlled variables and manipulation variables according to the autumatic control system of the invention.

An applicator containing polyester varnish (a polyester resin TVE-5326F manufactured by Toshiba Chemical Inc., composed of 40% of resin and 60% of solvent (cresol and naphtha)) was disposed below the enamelling oven. A copper wire of a diameter of 1.0 mm was passed through the applicator so as to be coated therearound with a layer of varnish. The copper wire with the varnish coating was run through the enamelling oven to heat the solvent in the varnish coated on the wire up to a high temperature with a pure butane gas supplied by the damper 5, as combusted by a honeycomb-shaped plutinum catalyst 6 and circulated through the oven by the blower 7. The reference temperature values at the measuring points 17, 18, 19 and 20 were selected to be 70, 450, 390 and 300 degrees Celsius, respectively. The dampers 5, 10, 11, 12 and 14 were controlled for their opening under the foregoing multivariable control, and then the temperatures at the measuring points 17–20 as well as the measuring point 16. The results are shown in FIG. 4, in which identical reference numerals denote identical parts in FIG. 4. Study of FIG. 4 indicates that the multivariable control started at the point X, and the temperatures as controlled variables at the measuring points 17–20 were independently regulated so as to reach their reference values within the zone Y. The reference values for the temperatures at the measuring points 18 and 19 were then selected to be 460 and 400 degrees Celsius, respectively, at the points P and Q. As shown in FIG. 4, the temperatures at the measuring points 18, 19 were independently regulated until they reach the selected reference values, respectively.

The present invention is thus particularly applicable to a controlled system such as an enamelling oven in which a plurality of measured variables such as temperatures including a plurality of controlled variables are variable by any one of a plurality of manipulation variables such as the degrees of damper openings. With the control system of the invention, in which the manipulation variables are controlled so as to adjust the controlled variables to the reference values, integrating action is effected on each of the variable factors which are derived from the differences between the controlled variables and the reference values, and the variable factors thus processed are added to the manipulation variables so that the latter will perform their mutual and independent functions for multivariable control to enable the controlled variables to approach the reference values.

The control system of the invention includes the feedforward and/or feedback action for obtaining improved response and stability of controlling operation.

Thus, there is provided in accordance with the invention a method of controlling an enamelling oven which has the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. A method of controlling an enamelling oven in which a plurality of measured variables such as temperatures:

$$Y = \begin{array}{c} Y_1 \\ \vdots \\ Y_m \end{array}$$

including a plurality of controlled variables:

$$\begin{array}{c} Y_1 \\ \vdots \\ Y_l \end{array}$$

are variable by any one of a plurality of manipulation variables such as the degrees of opening of dampers:

$$U = \begin{array}{c} U_1 \\ \vdots \\ U_n \end{array}$$

where l, n, and m are positive integers equal to or greater than 2 with m≧l, said method comprising the step of controlling said controlled variables to reach reference values therefor:

$$YR = \begin{array}{c} YR_1 \\ \vdots \\ YR_l \end{array}$$

by effecting integrating action on each of variable factors:

$$U'c = \begin{array}{c} U'c_1 \\ \vdots \\ U'c_n \end{array}$$

which are derived from:

$$\begin{pmatrix} C11 & \ldots & C1l \\ \vdots & & \vdots \\ Cn1 & \ldots & Cnl \end{pmatrix} \begin{pmatrix} Y1 - YR1 \\ \vdots \\ Yl - YRl \end{pmatrix}$$

where said matrix:

$$\begin{pmatrix} C11 & \ldots & C1l \\ \vdots & & \vdots \\ Cn1 & \ldots & Cnl \end{pmatrix}$$

is predetermined so that said controlled enamelling oven behaves in an optimum manner, to produce outputs $$Uc = \begin{pmatrix} Uc1 \\ \vdots \\ Ucn \end{pmatrix}$$

which serve as the manipulation variables, respectively; outputs:

$$UF = \begin{pmatrix} UF1 \\ \vdots \\ UFn \end{pmatrix}$$

which are obtained by effecting feedback action on said plurality of measured variables being added to said manipulation variables, said integrating action being stopped when at least sum of said outputs Uc-said outputs UF which are supplied to said manipulation variables exceeds a predetermined range.

2. A method according to claim 1 wherein outputs:

$$UN = \begin{pmatrix} UN1 \\ \vdots \\ UNn \end{pmatrix}$$

which are obtained by effecting feedforward action on said reference values are added to said manipulation variables.

3. A method according to claim 2 wherein said feedforward action is effected by linear processing.

4. A method according to claim 2 wherein said feedforward action includes dynamic compensation.

5. A method according to claim 2 wherein said sum includes said outputs UN.

6. A method according to claim 1, wherein said variable factors are produced and said integrating action is effected by linear processing.

7. A method according to claim 1, wherein said variable factors include dynamic compensation.

8. A method according to claim 1, wherein said feedback action is effected by linear processing.

9. A method according to claim 1, wherein said feedback action includes dynamic compensation.

10. A method of controlling an enamelling oven in which a plurality of measured variables such as temperatures:

$$Y = \begin{pmatrix} Y1 \\ \vdots \\ Ym \end{pmatrix}$$

including a plurality of controlled variables:

$$\begin{pmatrix} Y1 \\ \vdots \\ Yl \end{pmatrix}$$

are variable by any one of a plurality of manipulation variables such as the degrees of opening of dampers:

$$U = \begin{pmatrix} U1 \\ \vdots \\ Un \end{pmatrix}$$

where l, n, and m are positive integers equal to or greater than 2 with $m \geq l$, said method comprising the step of controlling said controlled variables to reach reference values therefor:

$$YR = \begin{pmatrix} YR1 \\ \vdots \\ YRl \end{pmatrix}$$

by effecting integrating action on each of variable factors:

$$U'c = \begin{pmatrix} U'c1 \\ \vdots \\ U'cn \end{pmatrix}$$

which are derived from:

$$\begin{pmatrix} C11 & \ldots & C1l \\ \vdots & & \vdots \\ Cn1 & \ldots & Cnl \end{pmatrix} \begin{pmatrix} Y1 - YR1 \\ \vdots \\ Yl - YRl \end{pmatrix}$$

where said matrix:

$$\begin{pmatrix} C11 & \ldots & C1l \\ \vdots & & \vdots \\ Cn1 & \ldots & Cnl \end{pmatrix}$$

is predetermined so that said controlled enamelling oven behaves in an optimum manner, to produce outputs $$Uc = \begin{pmatrix} Uc1 \\ \vdots \\ Ucn \end{pmatrix}$$

which serve as the manipulation variables, respectively, an initial setting for said integrating action being determined dependent on said measured variables.

11. A method according to claim 10 wherein outputs:

$$UN = \begin{matrix} UN1 \\ \vdots \\ UNn \end{matrix}$$

which are obtained by effecting feedforward action on said reference values are added to said manipulation variables.

12. A method according to claim 11 wherein said feed forward action is effected by linear processing.

13. A method according to claim 11 wherein said feed forward action includes dynamic compensation.

14. A method according to claim 10 wherein said variable factors are produced and said integrating action is effected by linear processing.

15. A method according to claim 10 wherein said variable factors include dynamic compensation.

* * * * *

UNITED STATES PATENT AND TRADEMARK OFFICE
CERTIFICATE OF CORRECTION

PATENT NO. : 4,406,399

DATED : September 27, 1983

INVENTOR(S) : Katsuhisa FURUTA, Takeshi HIRAI, Yoshinori NAKAMURA

It is certified that error appears in the above-identified patent and that said Letters Patent is hereby corrected as shown below:

In the Abstract, line 4, change "Y=(Y1...Yℓ)" to $--Y=\begin{Bmatrix} Y1 \\ \cdot \\ \cdot \\ \cdot \\ Yℓ \end{Bmatrix}--$.

line 6, change "(Y1...Ym)" to $--\begin{Bmatrix} Y1 \\ \cdot \\ \cdot \\ \cdot \\ Ym \end{Bmatrix}--$.

line 9, change "U=(U1...Um)" to $--U=\begin{Bmatrix} U1 \\ \cdot \\ \cdot \\ \cdot \\ Um \end{Bmatrix}--$.

line 14, change "YR=(YR1...YRℓ)" to $--YR=\begin{Bmatrix} YR1 \\ \cdot \\ \cdot \\ \cdot \\ YRℓ \end{Bmatrix}--$.

line 17, change "U'c=(Uc1...Ucm)" to $--U'c\begin{Bmatrix} Uc1 \\ \cdot \\ \cdot \\ \cdot \\ Ucm \end{Bmatrix}--$.

UNITED STATES PATENT AND TRADEMARK OFFICE
CERTIFICATE OF CORRECTION

PATENT NO. : 4,406,399          Page 2 of 2

DATED : September 27, 1983

INVENTOR(S) : Katsuhisa FURUTA, Takeshi HIRAI, Yoshinori NAKAMURA

It is certified that error appears in the above-identified patent and that said Letters Patent is hereby corrected as shown below:

line 20, change "Y-YR=(Y1-YR1...Y-YRℓ)=(ε1...εℓ)"

to —

$$Y-YR = \begin{Bmatrix} Y1-YR1 \\ \cdot \\ \cdot \\ \cdot \\ Y-YR\ell \end{Bmatrix} = \begin{Bmatrix} \varepsilon 1 \\ \cdot \\ \cdot \\ \cdot \\ \varepsilon\ell \end{Bmatrix} \,\text{—.}$$

line 22, change "Uc=(Uc...Ucm)" to 
$$-\text{Uc} = \begin{Bmatrix} Uc \\ \cdot \\ \cdot \\ \cdot \\ Ucm \end{Bmatrix} \text{—.}$$

Signed and Sealed this

Twenty-sixth Day of February 1985

[SEAL]

Attest:

DONALD J. QUIGG

Attesting Officer      Acting Commissioner of Patents and Trademarks

UNITED STATES PATENT AND TRADEMARK OFFICE
CERTIFICATE OF CORRECTION

PATENT NO. : 4,406,399

DATED : September 27, 1983

INVENTOR(S) : FURUTA et al

PAGE 1 OF 6

It is certified that error appears in the above-identified patent and that said Letters Patent is hereby corrected as shown below:

Column 3, line 6, change "Y1" to --$Y\ell$--;

line 18, after "where" change "1" to --$\ell$--;

line 19, change "m≥1" to --$m \geq \ell$--;

line 27, change "YR1" to --$YR\ell$--;

line 47, change "Y1 - YR1" to --$Y\ell - YR\ell$--;

line 47, change "$\varepsilon$1" to --$\varepsilon\ell$--.

Column 8, line 59, change "YR4" to --Y4--.

Column 9, line 21, after "values is" change "1" to --$\ell$--;

Column 9, lines 22-23, change "measured the number of variables" to --the number of measured variables--;

lines 23-24, change "m(1,m and n are positive integers with M≥1)" to --m ($\ell$, m and n are positive integers with $m \geq \ell$)--.

UNITED STATES PATENT AND TRADEMARK OFFICE
CERTIFICATE OF CORRECTION

PATENT NO. : 4,406,399

DATED : September 27, 1983

INVENTOR(S) : FURUTA et al

It is certified that error appears in the above-identified patent and that said Letters Patent is hereby corrected as shown below:

Claim 1, col. 10, lines 28-31, change "$Y = \begin{array}{c} Y1 \\ \cdot \\ \cdot \\ \cdot \\ Ym \end{array}$" to $-- Y = \begin{Bmatrix} Y1 \\ \cdot \\ \cdot \\ \cdot \\ Ym \end{Bmatrix} --$.

Claim 1, col. 10, lines 36-40, change "$\begin{array}{c} Y1 \\ \cdot \\ \cdot \\ \cdot \\ Y1 \end{array}$" to $-- \begin{bmatrix} Y1 \\ \cdot \\ \cdot \\ \cdot \\ Y\ell \end{bmatrix} --$.

Claim 1, col. 10, lines 44-48, change "$U = \begin{array}{c} U1 \\ \cdot \\ \cdot \\ \cdot \\ Un \end{array}$" to $-- U = \begin{Bmatrix} U1 \\ \cdot \\ \cdot \\ \cdot \\ Un \end{Bmatrix} --$.

Claim 1, col. 10, lines 55-59, change "$YR = \begin{array}{c} YR1 \\ \cdot \\ \cdot \\ \cdot \\ YR1 \end{array}$" to $-- YR = \begin{Bmatrix} YR1 \\ \cdot \\ \cdot \\ \cdot \\ YR\ell \end{Bmatrix} --$.

Claim 1, col. 10, lines 63-67, change "$U'c = \begin{array}{c} U'c1 \\ \cdot \\ \cdot \\ \cdot \\ U'cn \end{array}$" to $-- U'c = \begin{bmatrix} U'c1 \\ \cdot \\ \cdot \\ \cdot \\ U'cn \end{bmatrix} --$.

Claim 1, col. 10, lines 50 and 51 change "1" to $--\ell--$.

UNITED STATES PATENT AND TRADEMARK OFFICE
CERTIFICATE OF CORRECTION

PATENT NO. : 4,406,399

DATED : September 27, 1983

INVENTOR(S) : FURUTA et al

It is certified that error appears in the above-identified patent and that said Letters Patent is hereby corrected as shown below:

Claim 1, col. 11, lines 3-7, change
$$\begin{matrix} C11 & ... & C11 & Y1 & - & YR1 \\ \cdot & & \cdot & \cdot & & \cdot \\ \cdot & & \cdot & \cdot & & \cdot \\ \cdot & & \cdot & \cdot & & \cdot \\ Cn1 & ... & Cn1 & Y1 & - & YR1 \end{matrix}$$
to
$$\begin{bmatrix} C11 & ... & C1\ell & Y1 & - & YR1 \\ \cdot & & \cdot & \cdot & & \cdot \\ \cdot & & \cdot & \cdot & & \cdot \\ \cdot & & \cdot & \cdot & & \cdot \\ Cn1 & ... & Cn\ell & Y\ell & - & YR\ell \end{bmatrix}$$.

Claim 1, col. 11, lines 11-15, change
$$\begin{matrix} C11 & ... & C11 \\ \cdot & & \cdot \\ \cdot & & \cdot \\ Cn1 & ... & Cn1 \end{matrix}$$
to
$$\begin{bmatrix} C11 & ... & C1\ell \\ \cdot & & \cdot \\ \cdot & & \cdot \\ Cn1 & ... & Cn\ell \end{bmatrix}$$.

Claim 1, col. 11, lines 20-24, change "Uc= $\begin{matrix} Uc1 \\ \cdot \\ \cdot \\ Ucn \end{matrix}$" to --Uc= $\begin{bmatrix} Uc1 \\ \cdot \\ \cdot \\ Ucn \end{bmatrix}$ --.

Claim 1, col. 11, lines 29-33, change "UF= $\begin{matrix} UF1 \\ \cdot \\ \cdot \\ UFn \end{matrix}$." to --UF= $\begin{bmatrix} UF1 \\ \cdot \\ \cdot \\ UFn \end{bmatrix}$ --.

UNITED STATES PATENT AND TRADEMARK OFFICE
CERTIFICATE OF CORRECTION

PATENT NO. : 4,406,399  PAGE 4 OF 6
DATED : September 27, 1983
INVENTOR(S) : FURUTA et al It is certified that error appears in the above-identified patent and that said Letters Patent is hereby corrected as shown below:

Claim 2, col. 11, lines 43-46, change "UN= $\begin{matrix} UN_1 \\ \cdot \\ \cdot \\ \cdot \\ UN_n \end{matrix}$." to --UN= $\begin{bmatrix} UN_1 \\ \cdot \\ \cdot \\ \cdot \\ UN_n \end{bmatrix}$--.

Claim 10, col. 12, lines 2-6, change "Y= $\begin{matrix} Y_1 \\ \cdot \\ \cdot \\ \cdot \\ Y_m \end{matrix}$." to --Y= $\begin{bmatrix} Y_1 \\ \cdot \\ \cdot \\ \cdot \\ Y_m \end{bmatrix}$--.

Claim 10, col. 12, lines 10-14, change " $\begin{matrix} Y_1 \\ \cdot \\ \cdot \\ \cdot \\ Y_1 \end{matrix}$." to -- $\begin{bmatrix} Y_1 \\ \cdot \\ \cdot \\ \cdot \\ Y_\ell \end{bmatrix}$--.

Claim 10, col. 12, lines 18-22, change "U= $\begin{matrix} U_1 \\ \cdot \\ \cdot \\ \cdot \\ U_n \end{matrix}$." to --U= $\begin{bmatrix} U_1 \\ \cdot \\ \cdot \\ \cdot \\ U_n \end{bmatrix}$--.

Claim 10, col. 12, lines 29-33, change "YR= $\begin{matrix} YR_1 \\ \cdot \\ \cdot \\ \cdot \\ YR_1 \end{matrix}$." to --YR= $\begin{bmatrix} YR_1 \\ \cdot \\ \cdot \\ \cdot \\ YR_\ell \end{bmatrix}$--.

Claim 10, lines 24 and 25, change "1" to "$\ell$".

UNITED STATES PATENT AND TRADEMARK OFFICE
CERTIFICATE OF CORRECTION

PATENT NO. : 4,406,399          PAGE 5 OF 6

DATED : September 27, 1983

INVENTOR(S) : FURUTA et al

It is certified that error appears in the above-identified patent and that said Letters Patent is hereby corrected as shown below:

Claim 10, col. 12, lines 38-42, change "$U'c = \begin{matrix} U'c1 \\ \cdot \\ \cdot \\ \cdot \\ U'cn \end{matrix}$" to $-- U'c = \begin{bmatrix} U'c1 \\ \cdot \\ \cdot \\ \cdot \\ U'cn \end{bmatrix} --.$ Claim 10, col. 12, lines 46-50, change "$\begin{matrix} C11 \ldots C1l & Y1 - YR1 \\ \cdot & \cdot & \cdot & \cdot \\ \cdot & & & \cdot \\ \cdot & \cdot & \cdot & \cdot \\ Cn1 \ldots Cnl & Yl - YRl \end{matrix}$" to $-- \begin{bmatrix} C11 \ldots C1l & Y1 - YR1 \\ \cdot & \cdot & \cdot & \cdot \\ \cdot & \cdot & \cdot & \cdot \\ \cdot & \cdot & \cdot & \cdot \\ Cn1 \ldots Cnl & Yl - YRl \end{bmatrix} --.$ Claim 10, col. 12, lines 54-58, change "$\begin{matrix} C11 \ldots C1l \\ \cdot & \cdot \\ \cdot & \cdot \\ \cdot & \cdot \\ Cn1 \ldots Cn1 \end{matrix}$" to $-- \begin{bmatrix} C11 \ldots C1l \\ \cdot & \cdot \\ \cdot & \cdot \\ \cdot & \cdot \\ Cn1 \ldots Cnl \end{bmatrix} --.$ Claim 10, col. 12, lines 63-67, change "$Uc = \begin{matrix} Uc1 \\ \cdot \\ \cdot \\ \cdot \\ Ucn \end{matrix}$" to $-- Uc = \begin{bmatrix} Uc1 \\ \cdot \\ \cdot \\ \cdot \\ Ucn \end{bmatrix} --.$

UNITED STATES PATENT AND TRADEMARK OFFICE
CERTIFICATE OF CORRECTION

PATENT NO. : 4,406,399

DATED : September 27, 1983

INVENTOR(S) : FURUTA et al

It is certified that error appears in the above-identified patent and that said Letters Patent is hereby corrected as shown below:

Claim 11, col.13, lines 8-12, change "UN= $\begin{matrix} UN1 \\ \cdot \\ \cdot \\ \cdot \\ UNn \end{matrix}$ ." to --UN= $\begin{bmatrix} UN1 \\ \cdot \\ \cdot \\ \cdot \\ UNn \end{bmatrix}$ --.

Signed and Sealed this

Sixteenth Day of August, 1988

Attest:

DONALD J. QUIGG

Attesting Officer

Commissioner of Patents and Trademarks